(12) United States Patent
Kaiser (10) Patent No.: US 8,590,605 B2
(45) Date of Patent: Nov. 26, 2013

(54) HEAT EXCHANGE MODULE FOR COGENERATION SYSTEMS AND RELATED METHOD OF USE

(75) Inventor: Stewart Kaiser, Boca Raton, FL (US)

(73) Assignee: Everlite Hybrid Industries, Boca Raton, FL (US)

( * ) Notice: Subject to any disclaimer, the term of this patent is extended or adjusted under 35 U.S.C. 154(b) by 819 days.

(21) Appl. No.: 12/824,857

(22) Filed: Jun. 28, 2010

(65) Prior Publication Data

US 2010/0326641 A1    Dec. 30, 2010

Related U.S. Application Data

(63) Continuation of application No. 12/760,256, filed on Apr. 14, 2010, and a continuation of application No. 12/069,211, filed on Feb. 8, 2008.

(51) Int. Cl.
| | |
|---|---|
| F28D 7/02 | (2006.01) |
| F28D 7/10 | (2006.01) |
| B60L 1/02 | (2006.01) |
| F01K 15/00 | (2006.01) |
| F01K 17/02 | (2006.01) |
| F02C 6/00 | (2006.01) |
| F02C 6/18 | (2006.01) |

(52) U.S. Cl.
USPC ................................ 165/163; 165/157; 290/2

(58) Field of Classification Search
USPC ................. 60/298, 320; 123/3; 165/157, 163; 290/2, 52
See application file for complete search history.

(56) References Cited

U.S. PATENT DOCUMENTS

| | | |
|---|---|---|
| 3,881,962 A | 5/1975 | Rubinstein |
| 4,004,573 A | 1/1977 | Frieling et al. |
| 4,314,547 A | 2/1982 | Walsh |
| 4,375,806 A | 3/1983 | Nishman |
| 4,520,305 A | 5/1985 | Cauchy |
| 4,637,454 A * | 1/1987 | Lowes .......................... 165/280 |
| 4,942,863 A | 7/1990 | Chou et al. |
| 5,060,722 A | 10/1991 | Zdenek et al. |
| 5,062,409 A | 11/1991 | Kamanaka et al. |
| 5,427,086 A | 6/1995 | Brownell |
| 6,026,804 A | 2/2000 | Schardt et al. |
| 6,101,716 A | 8/2000 | Schulz |
| 6,109,339 A | 8/2000 | Talbert et al. |
| 2002/0153127 A1 * | 10/2002 | Togawa et al. .................. 165/51 |
| 2003/0051476 A1 | 3/2003 | Reno |
| 2004/0025931 A1 | 2/2004 | Aguglia |
| 2004/0207366 A1 | 10/2004 | Sung |
| 2005/0072455 A1 | 4/2005 | Gerhardinger et al. |
| 2005/0206167 A1 * | 9/2005 | Gehret ............................ 290/2 |
| 2008/0041362 A1 | 2/2008 | Filippone |

* cited by examiner

Primary Examiner — Kenneth Bomberg
Assistant Examiner — Audrey K Bradley
(74) Attorney, Agent, or Firm — Allen, Dyer, Doppelt, Milbrath & Gilchrist, P.A.

(57) ABSTRACT

The invention is directed to a heat exchange module to help employ usable heat to pre-warm a water supply prior to entry into a tankless water heater. The module comprises an insulated housing having an inner shell having a top end, bottom end and cylindrical middle portion. A first intake attaches to the insulated housing which introduces cooling water from the cogeneration system, while a second intake feeds the water supply coils (positioned within the insulated housing) to effectuate heat exchange with the cooling water. After heat exchange, a first outlet removes cooling water for return to the cogeneration system, while a second outlet removes the water supply from the cooling coils. Upon removal, this water supply may be fed into a tankless water heater. A controller connected to both outlets and inlets optimizes efficient exchange of energy through timing introduction and removal of the water supply from the module.

18 Claims, 7 Drawing Sheets

HEAT EXCHANGE MODULE FOR COGENERATION SYSTEMS AND RELATED METHOD OF USE

CROSS-REFERENCE TO RELATED APPLICATIONS

The application seeks priority to U.S. patent application Ser. No. 12/760,256 entitled "High Efficiency Cogeneration System and Related Method of Use," filed on Apr. 14, 2010, which in turn seeks priority to U.S. patent application Ser. No. 12/069,211 entitled "Combination Gas-Fired Furnace and GasPower Electrical Generator" filed on Feb. 8, 2008, the contents of which are hereby both incorporated by reference in their entirety.

FIELD OF THE INVENTION

This invention relates to a high efficiency heat exchange module that employs usable heat from a cogeneration system to pre-heat water prior to entry into a tankless (flash) water heater. More specifically, the invention teaches a module that receives a spent fluid from a cooling manifold within a cogeneration system to assist in preheating water prior to entry into a tankless (flash) water heater to reduce overall fuel costs and increase thermal efficiencies.

BACKGROUND OF THE INVENTION

Cogeneration represents a relatively new concept in the field of generating electricity. Traditionally, electricity has been created at centralized facilities—typically through burning a fossil fuel like coal—which is then transported through an electricity grid to individual residential and commercial facilities.

Within the past several years, cogeneration systems have been developed to essentially reduce both need and reliance on these grids. More specifically, cogeneration systems employ a heat engine (typically a combustion engine) or power station located at the residential or commercial facility itself to simultaneously generate both electricity and useable heat. Most cogeneration systems use a centralized reservoir of fossil fuel to create electricity, heat running water and air and often provide energy back into the grid for credit.

Recently, there have been several forms of cogeneration systems developed for use in residential homes and smaller commercial facilities. These systems have been dubbed "mini-cogeneration" systems—due to their modest size and performance. Another common name associated with these systems is a distributed energy resource ("DER") system.

Regardless of moniker, these systems produce usually less than 5 kWe. Instead of burning fuel to merely heat space or water, some of the energy is converted to electricity in addition to heat. This electricity can be used within the home or business or, if permitted by the grid management, sold back into the municipal electricity grid. A recent study by the Claverton Energy Research Group found that such a co-generation system offered the most cost effective means of reducing $CO_2$ emissions—even compared to use of photovoltaics.

Apart from the energy conversation associated with mini-cogeneration systems, the technology also offers additional logistical benefits. Such cogeneration systems often offer more reliable energy solutions to residential dwellings in rural areas in which it is difficult to gain access to the grid. Alternatively, these systems offer more stable energy supplies in areas often affected by natural disasters such as hurricanes, tornadoes and earthquakes—where the downing of power lines will often lead to large periods with a lack of energy.

While there exist multiple benefits for micro-cogeneration systems, they currently possess several drawbacks. One primary drawback is that despite the creation of several forms of usable heat generated as a byproduct from the burning of fossil fuels there has been very little done to harness this usable heat for use in other home energy systems. For example, current cogeneration system designs fail to employ this usable heat to help create hot water for use within the home or commercial facility. Rather, many cogeneration systems still use archaic systems such as water heaters and related standalone water heating systems which use a separate energy source to warm water—such as electricity or gas.

Tankless (flash) water heaters (hereinafter "tankless heaters") have offered an alternative to traditional water heaters. These tankless heaters allow on-demand sources of instantly heated water by warming a specific quantity of water—instead of storing heated water until a need arises in a home or commercial facility. Accordingly, tankless heaters allow a more regulated temperature for heated water, without risk of spending a pre-heated quantity of such water during consumption.

One problem associated with tankless water heaters is the reality that water coming into the device must be within a specific temperature range. Otherwise, it is impossible to heat the water instantly. While this does not pose an issue in tropical and subtropical areas like California, Texas, Arizona and Florida—the application and use of tankless water heaters is limited in colder climates like the Midwest and Northeast. This is primarily because the incoming water is often close to freezing during the winter months—preventing instantaneous heating.

Accordingly, there is a need in the field of micro-cogeneration systems for a system that employs usable heat to increase efficiency of other systems—including but not limited to water heating systems. Moreover, there is a need in the art of tankless heaters to allow pre-heating of water prior to entry into the tankless heater in order for these more efficient systems to be used in colder climates such as the Midwest and the Northeast—as well as other related climates. Such systems should ensure greater capture of usable heat to decrease the overall consumption of energy by cogeneration systems for residential and commercial use. Finally, such improved systems should preferably be compact, self-contained and easy to use.

SUMMARY OF THE INVENTION

The instant inventions solves many of the limitations found in current cogeneration systems and provides an improved system of employing usable heat to increase efficiencies to provide lower cost hot water for domestic or commercial use. The invention is directed to a heat exchange module that comprises an insulated housing having an inner shell that may include a top end, a bottom end, and a cylindrical middle portion. This cylindrical middle portion may include an insulate having a plurality of insulating layers. Positioned on the top end of the insulated housing is a first intake which introduces cooling water from the cogeneration system into the insulated housing. A second intake feeds a water supply (municipal drinking water or well water) into one or more contact coils (positioned within the insulated housing) to effectuate heat exchange with the cooling water.

The module may further include a first outlet capable of removing cooling water from the insulated housing for return to the cogeneration system. A second outlet helps remove the water supply (now warmed from heat exchange with the warmer cooling water) from the cooling coils. Upon removal, this water supply may be fed into a tankless water heater. The module may further include a pressure relief valve positioned on the top end of the insulated housing, as well as an emergency drain pan for reclaiming cooling water released by the pressure relief valve. A controller may be connected to the first inlet, second inlet, first outlet and second outlet—in order to regulate introduction and removal of cooling water within the insulated housing. Such controller can also time the removal of supply water from the insulated housing to the tankless water heater.

The invention is also directed to a method of employing usable heat created by a cogeneration system. The method first includes the step of feeding cooling water from the cogeneration system into a first inlet which in turn fills a module having an insulated housing. Here; the insulated housing has a top end, a bottom end and a corresponding cylindrical middle portion. The second step includes introducing a water supply through a second inlet connected to one or more contact coils positioned within the insulated housing. Next, the method contemplates effectuating heat exchange through the cooling water interacting with the contact coils filled with the cooler water supply. Upon heat exchange, cooling water is removed from the module, while water supply is removed from the contact coils and transported to a tankless water heater.

The method further contemplates use of a controller which is connected to the first inlet, second inlet, first outlet and second outlet. The method thus includes the step of using the controller to regulate introduction and removal of cooling water within the insulated housing. In addition, the controller can help time the removal of water supply from the cooling coils within the insulated housing.

BRIEF DESCRIPTION OF THE DRAWINGS

For a fuller understanding of the invention, reference is made to the following detailed description, taken in connection with the accompanying drawings illustrating various embodiments of the present invention, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Positioning and Location of System

Figure 1:
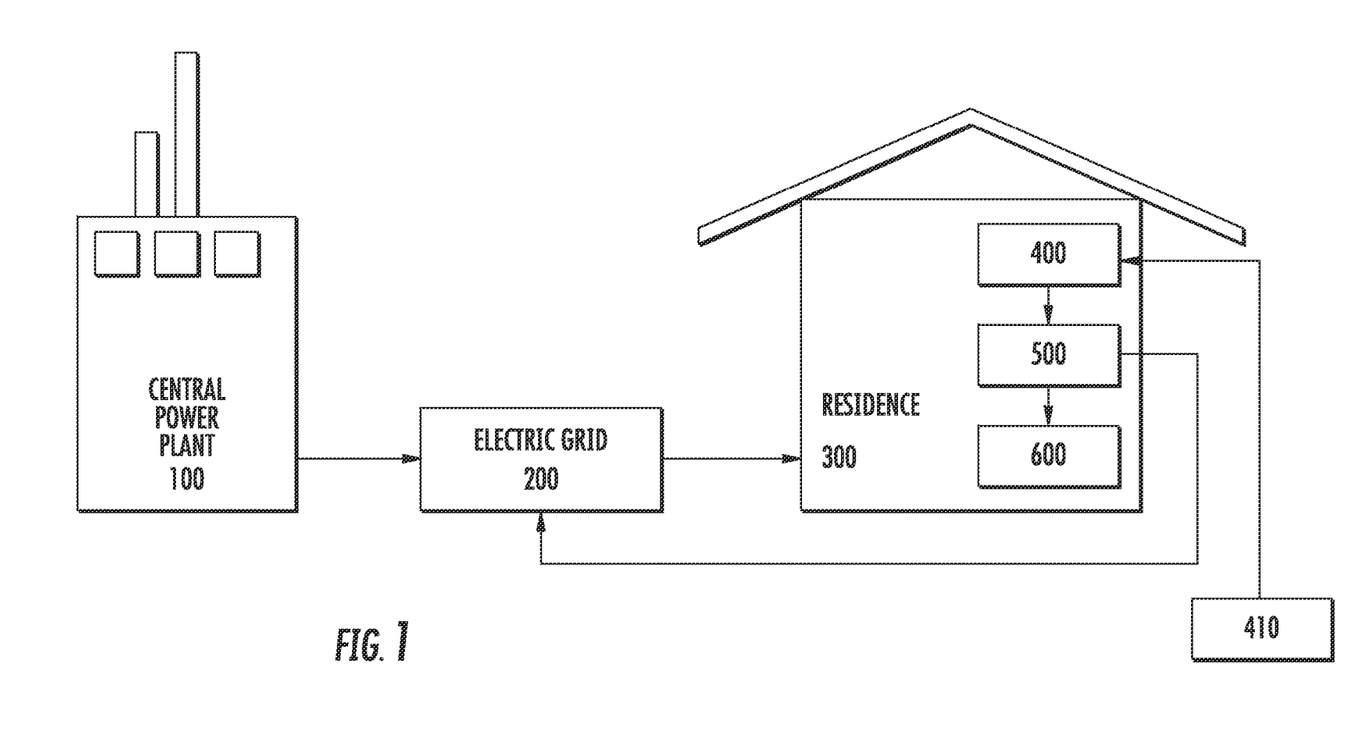
FIG. 1 is a schematic illustrating the overall positioning of the cogeneration system in light of the electricity grid.
Figure 2:
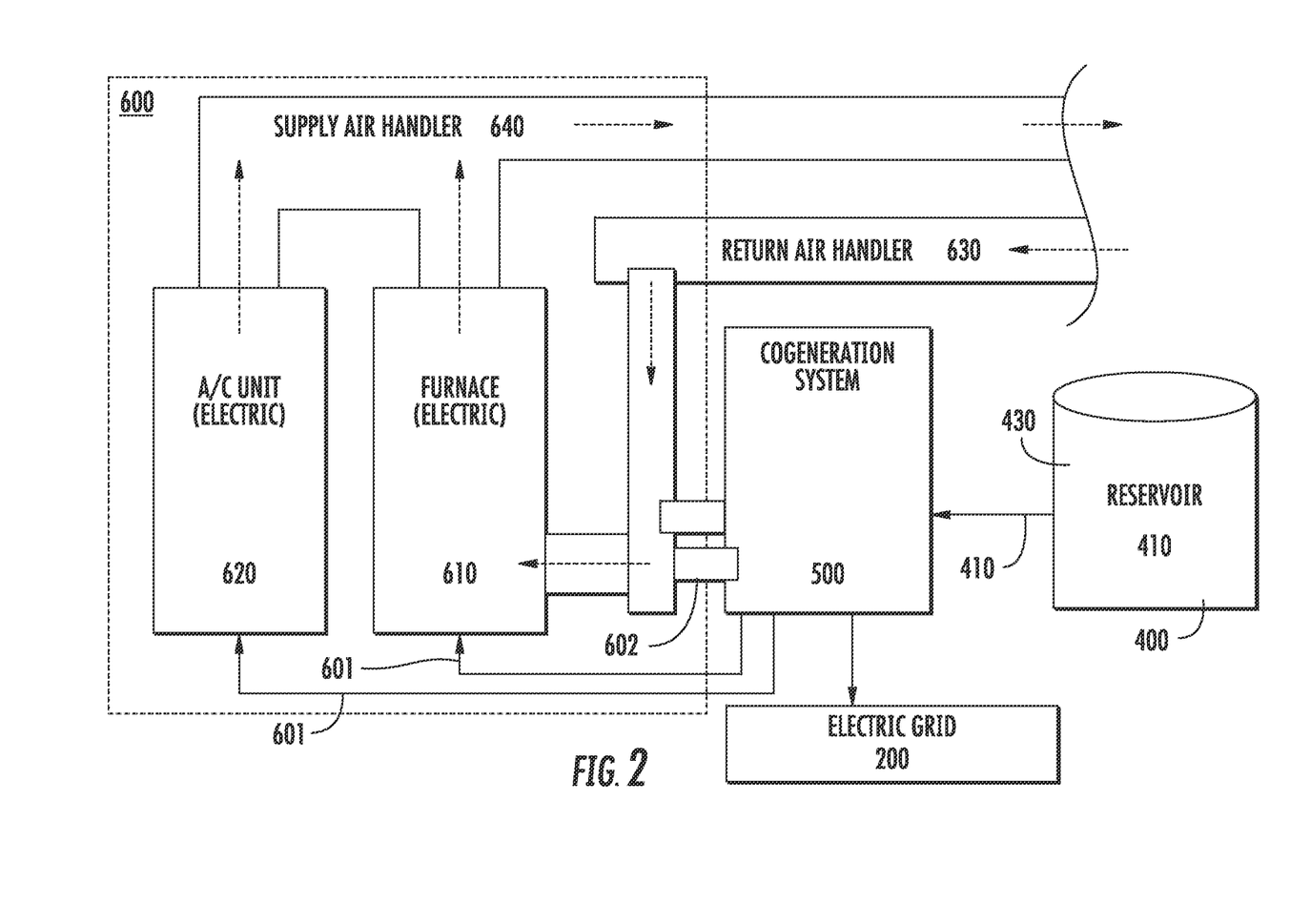
FIG. 2 is a diagram illustrating placement of the cogeneration system and various connections with the existing furnace, air-conditioning and air handlers.

FIG. 1 and FIG. 2 both illustrate, by way of example, one positioning and location of the preferred cogeneration system 500. FIG. 1 provides a general illustration of a conventional centralized power generation system. Here, a central power plant 100 generates electricity for disbursement to a plurality of various residential and commercial facilities 300 throughout a distinct geographic area. Such central power plant 100 can create electricity through an energy source 430, such as conventional burning of fossil fuels (typically coal) through nuclear energy, or harnessing geothermal energy.

Positioned between the central power plant 100 and the residential or commercial facility 300 is the electric grid 200. This electric grid 200 consists of various transformers, power stations and power lines that transport electricity from the central power plant 100. This electricity is then supplied to residential or commercial facilities 300 for use.

When a residential or commercial facility employs the invention, it must also include various components to properly service the overall apparatus. This includes a fuel source 400 that supplies a sufficient amount and quantity of energy to the cogeneration system 500. Such fuel source 400 may include, but is certainly not limited to, a reservoir 410 of fossil fuels, such as petroleum, oil, propane, butane, ethanol, natural gas, liquid natural gas (LNG) or fuel oil. Alternatively, the fuel source 400 may alternatively be a fuel line 420 such as a natural gas or propane line supplied by a municipality. Regardless, either fuel source 400 must supply sufficient energy to power the cogeneration system 500—which in turn can create electricity and usable heat for the furnace 600 and other appliances.

FIG. 1 also illustrates how the cogeneration system 500 can supply energy back to the electricity grid 200 for credits. This occurs when the cogeneration system 500 supplies a greater level of energy than required by the facility 300. While FIG. 1 shows the placement of the cogeneration system in light of the electric grid 200, FIG. 2 shows the interconnectivity within the residential facility 300 itself. As illustrated, an energy source 430 stored within a reservoir 410 (or fed by a fuel line 420) is supplied to the cogeneration system 500. Spending of this energy source 430 within the cogeneration system 500 creates two forms of energy: electricity 601 and usable heat 602. The electricity 601 can provide energy to the residential facility 300, as well as power both the furnace 610 and the air-conditioning unit 620. Alternatively, the furnace 610 can be supplied energy directly from the reservoir 410.

In addition, usable heat 602 created by the cogeneration system 500 can be used to heat air from a return air handler 630 prior to being introduced into the furnace 610 for heating. By doing so, the system essentially pre-heats the incoming cooler air prior to being warmed by the furnace 610, which in turn requires less energy (and results in less strain on the furnace 610). This is one of many forms of energy conservation contemplated by the invention.

Once heated air leaves the furnace 610, it is positioned within a supply air handler 640 to be circulated throughout the residential facility 300. Alternatively, when cooler air is desired, the convention contemplates having the air conditioning unit 620 supply cooler air to the supply air handler 640. As such, the apparatus taught by the invention requires interplay and interconnectivity between the cogeneration system 500, the furnace 610, the air conditioning unit 620 and both air handlers 630 and 640 to ensure efficient cooling and heating of air circulated throughout the home.

The Cogeneration System

Figure 3:
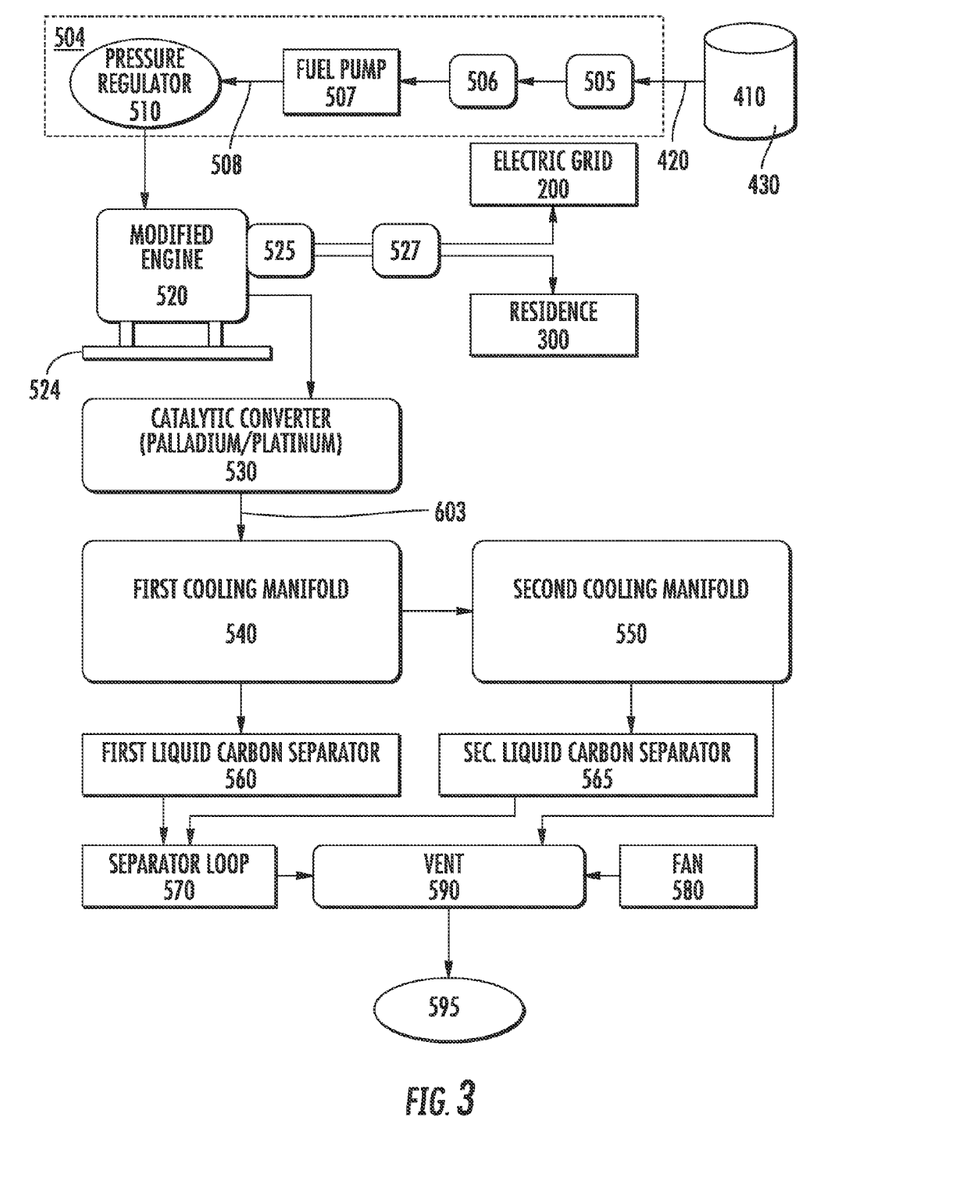
FIG. 3 illustrates the primary components of the cogeneration system including the catalytic converter and cooling manifolds.

FIG. 3 illustrates, by way of example, the components that make up the cogeneration system 500. As shown, the primary components of the apparatus include a reservoir 410 capable of housing an energy source 430 (which can be a fossil fuel), a regulator system 504, a modified combustion engine 520 (hereinafter referred to simply as a "modified engine"), a catalytic converter 530, and two cooling manifolds 540 and 550 which help treat the various hot gasses 603 which form as byproduct from the modified engine 520. Other additional or substitute components will be recognized and understood by those of ordinary skill in the art after having the benefit of the foregoing disclosure.

As illustrated in FIGS. 2 and 3, the first component of the cogeneration system 500 is the fuel source 400, which can be a reservoir 410 (or alternatively a fuel line 420). The reservoir 410 is of a size and dimension to provide a sufficient amount and quantity of an energy source 430 to fuel the cogeneration system 500 for a defined period of time preferably thirty days. Moreover, the reservoir 410 is designed to maintain a variety of fossil fuels including petroleum, natural gas, propane, methane, ethanol, biofuel, fuel oil or any similar and related fuel known and used to create energy via combustion. The reservoir 410 is typically housed outside of the residential facility 300 for safety and aesthetics.

Regardless of the type, the energy source 430 is drawn out of the reservoir 410 and treated for injection into the modified engine 520 through a regulator system 504. This regulator system 504 ensures that the energy source 430 is fed to the modified engine 520 at a specific pressure and flow rate— regardless of the outside temperature, pressure or weather conditions. Because the cogeneration system 500 will be employed in a variety of conditions from low lying areas to the mountains, in tropical climates to artic regions, the regulator system 504 must be self-regulating, robust and capable of handling large swings in weather conditions.

As illustrated in FIG. 3, the regulator system 504 includes four primary components: two fuel valves 505 and 506, a fuel pump 507 and a pressure regulator 510. Other related and additional components will be recognized and understood by those of ordinary skill in the art upon review of the foregoing. The energy source 430 is drawn from the reservoir through the fuel pump 507 for transport into the modified engine 520.

Positioned between the reservoir 410 and fuel pump 507 are a plurality of fuel valves 505 and 506. More specifically, there is a first fuel valve 505 and second fuel valve 506— which function to help regulate the flow and velocity of the energy source 430. The underlying purpose of both fuel valves 505 and 506 is to ensure redundancy in case one valve malfunctions, becomes clogged or becomes inoperable.

A pressure regulator 510 is positioned after the fuel pump 507 to ensure the proper pressure of the energy source 430 prior to entry into the modified engine 520. The energy source 430 travels throughout both fuel valves 505 and 506, the fuel pump 507 and the pressure regulator 510 through a sixteen gauge shell, two inch fire rated insulation acoustic lined conduit 508 which includes a sixteen gauge interior body with powder coating.

Once the pressure of the power source 430 stabilizes through use of the pressure regulator 510, the fuel then enters the modified engine 520. The modified engine 520 can act as a regular combustion engine to burn the power source 430, which in turn drives one or more pistons 521 to turn a shaft 522 that rotates an alternator 523 to create electricity.

Byproducts of the modified engine 520 include usable heat 602, as well as hot gases 603. These hot gases 603 include, but are not necessarily limited to, HC, CO, $CO_2$, $NO_x$, $SO_x$ and trace particulates (C9PM0). When leaving the modified engine 520, these hot gasses 603 have a pressure between 80 to 100 psi and a temperature between 800 to 1200 degrees Fahrenheit. These high pressure and temperature hot gasses 603 are then transported into the catalytic converter 530 for treatment.

The modified engine 520 illustrated in both FIG. 3 ensures delivery of usable electricity to not only the residential facility 300 but also the electricity grid 200. As shown in FIG. 3, this is achieved through combination of a vibration mount 524 and a harmonic distort alternator 525—both of which are attached to the modified engine 520. The vibration mount 524 is positioned below the modified engine 520 through a plurality of stabilizing legs.

The function and purpose of the vibration mount 524 is to ensure that the modified engine 520 is not only secure but also that it does not create a distinct frequency—through the turning of the various pistons 521, shaft 522, and alternator 523 (shown in greater detail in FIG. 6)—to risk degrading the quality of usable electricity flowing from the cogeneration system 500. This is because the electricity grid 200 requires a very specific and regulated electricity supply.

The uniform feed of electricity to both the facility 300 and electricity grid 200 is further aided by the harmonic distort alternator 525. As shown in FIG. 3, the harmonic distort alternator 525 is positioned directly on the modified engine 520 and prior to both the residential facility 300 and electricity grid 200. This harmonic distort alternator 525 regulates the amplification and voltage of electricity. In addition, a subsequent electricity filter 527 can be used to provide a final regulation of the electricity. A more detailed description of this system is offered in FIG. 6 described in greater detail below.

FIG. 3 also illustrates the placement, positioning and utility of the catalytic converter 530. The catalytic converter 530 functions to help ensure the proper treatment of the hot gases 603 created by combustion within the modified engine 520— in order to reduce levels of toxic byproducts being released into the atmosphere.

Overall efficiency of the catalytic converter 530 is based upon two primary chemical properties: (a) selection of the correct platinum based catalytic material, and (b) regulation of the proper temperature and pressure of the hot gases 603 when entering the catalytic converter 530. More specifically, the invention contemplates feeding the various hot gases 603 into the catalytic converter 530 at between 800 to 1000 degrees Fahrenheit and at a pressure ranging between 80 to 100 psi. The preferred catalytic material is a combination of palladium and platinum. More specifically, the preferred catalyst contemplated by the invention includes 5-30% palladium and 70-95% platinum by weight. However, other percentages are contemplated by the invention. Based upon the invention, the catalytic converter 530 is 99.99% efficient in converting the various hot gases 603 into non-toxic treated byproduct 604.

Hot gases 603 treated by the catalytic converter 530 are then transported into one or more cooling manifolds 540 and 550. As shown in both FIGS. 3 and 5, each cooling manifold 540 includes a series of heat exchangers tasked with cooling the various hot gases 603 to essentially ambient temperature. Within each manifold, cooling water 543 is supplied from an external water supply line 542 (usually the same as used by the facility 300) in a first conduit 544. This first conduit 544 encapsulates a second conduit 545 in which hot gases 603 flow through the manifold 540. Based upon the temperature gradient created between both conduits 544 and 545, the hot gases 603 are cooled while the cooling water 543 is warmed.

As shown in greater detail in FIG. 3, once the hot gases 603 are cooled, they leave the cooling manifold 530 and enter into a liquid separator 560. At this point, the hot gases 630 are at or near ambient temperature. Moreover, much of the hot gases 603 have been filtered for either removal into the atmosphere or recycled for re-treatment in the catalytic converter 520. Such hot gases 603—which are mostly light by-products—are filtered by the liquid separator 560. The liquid separator 560 creates a sufficient vacuum within the remaining hot gases 603 to remove these light-weight byproducts 604 for eventual off-gassing.

As shown in FIG. 3, it is preferred that there be at least two cooling manifolds 540 and 550 to separate and bring the hot gases 603 to ambient temperature: a first cooling manifold 540 and second cooling manifold 550. As shown, the second cooling manifold 550 feeds into a second liquid separator 565—which functions the same as the first liquid separator 560. There are two contemplated designs for the invention. First, the first cooling manifold 540 can feed into a second cooling manifold 550 to create an "in series" design. Alternatively, both cooling manifolds 540 and 540 can work in parallel—such that they both receive hot gases 603 from the catalytic converter 530 to be cooled and separated by both liquid separators 560 and 565 also in parallel.

Materials drawn from both liquid separators 560 and 565 are then placed in a separator loop 570. This loop 570 functions to circulate the various cooled by-products and allow off gassing through a vent 590. The vent 590 may be aided by a fan 580.

Control and Storage of Generated Electricity

Figure 4:
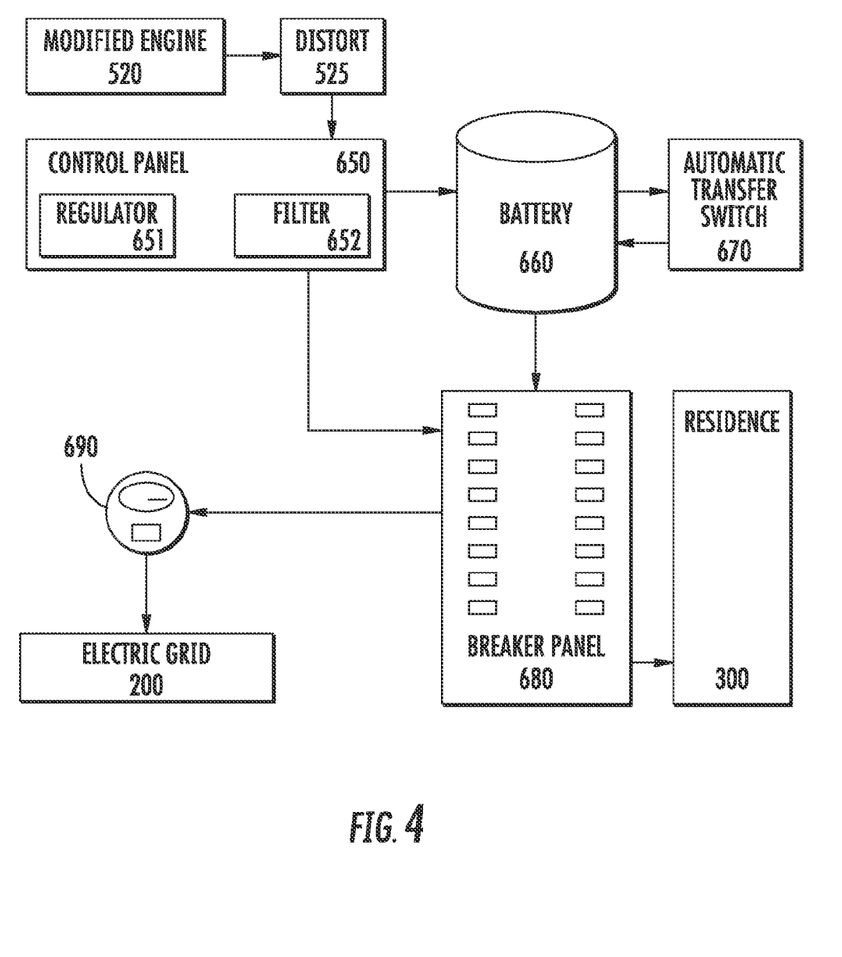
FIG. 4 is a schematic illustrating the various components of the control system, which includes a battery.

FIG. 4 illustrates, by way of example, one manner in which electricity created by the cogeneration system 500 is controlled, stored and sold back to the electricity grid 200. As shown and described in greater detail above, electricity is generated in the modified engine 520 through combustion of an energy source 430. This electricity is sent to the harmonic distort alternator 525 to ensure the current matches the consistency of electricity found in the electricity grid 200.

In the embodiment shown in FIG. 4, electricity leaves the distort alternator 525 and flows into the control panel 650. The control panel 650 includes several components to filter and regulate the incoming electricity. First, the control panel 650 includes a regulator 651 that helps purify the current of the electricity coming from the modified engine 520. Second, the control panel 650 includes a filter 652 that normalizes any noise or distortion remaining within the current.

Filtered and regulated electricity can then be directed to two receptacles: either a battery 660 (which alternatively can be an inverter) for later use or directly to the facility 300. As shown in FIG. 4, the cogeneration system 500 can include a battery 660 capable of storing electricity for later use by the facility 300. Attached to the battery is an automatic transfer switch 670. The switch 670 functions to gauge energy needs of the residential facility 300. If the home needs or anticipates greater energy use, the switch 670 ensures that electricity is drawn from the battery for use by the facility 300.

As further shown in FIG. 4, electricity can flow either from the control panel 650 or the battery 660 into the breaker panel 680 of the facility 300. The breaker panel 680 allows various appliances throughout the residential facility 300 to be supplied with electricity from the cogeneration system 500. Excess energy not needed by the breaker panel 680 to supply the energy needs of the facility 300 is then transported to the electricity grid 200. Prior to transport to the electricity grid 200, it is preferable that current flows through a meter 690 to measure the credits appropriate for the residential facility 300 to receive from the public utility.

The Cooling Manifolds

Figure 5:
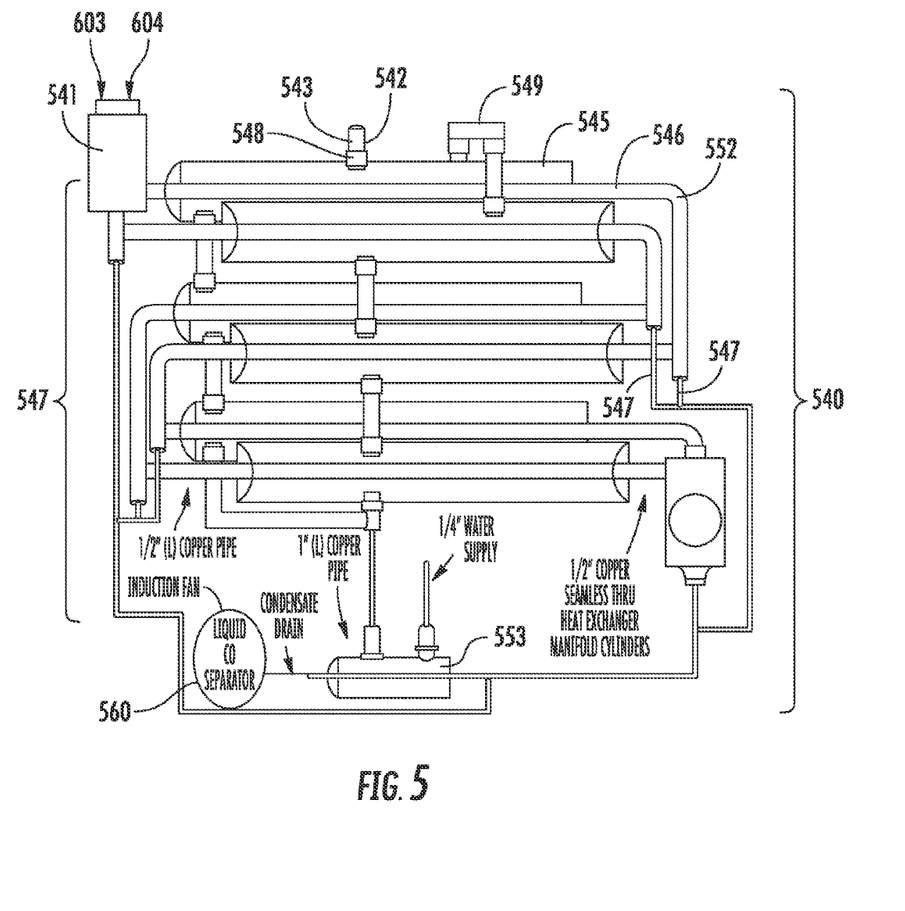
FIG. 5 is a schematic that illustrates the components of the first cooling manifold.

FIG. 5 illustrates, by way of example, the first cooling manifold 540. The preferred first cooling manifold 540 functions essentially as a heat exchanger to necessarily cool the various hot gases 603, generated from the modified engine 520, which have been treated by the catalytic converter 530. Based upon treatment, the combination of platinum and palladium within the catalytic converter 530, resulting in 99.99% conversion of these various hot gases 603 into inert and safe treated byproduct 604. The remaining non-treated hot gases 603 and treated byproduct 604 are then separated and filtered through the first cooling manifold 540 (in combination with the first liquid separator 560) through a temperature gradient effectuated by interaction with cooling water.

As illustrated in FIG. 5, the first cooling manifold 540 includes, but is not necessarily limited to, a collection chamber 541, a water supply line 542, cooling water 543, a first conduit 544, a second conduit 545, a third conduit 546, a plurality of connecting elbows 552 and a condensate drain 553. While FIG. 5 denotes six portions of the first conduit 544 in parallel relation to one another, the invention contemplates up to twenty-one such portions to ensure effective treatment and separation of the various hot gasses 603 and treated byproduct 604. Moreover, while FIG. 5 shows the various parts and functionality of the first cooling manifold 540, it is understood that these are the same primary components also found in the second cooling manifold 550.

As further shown in FIG. 5, hot gases 603 and treated byproduct 604 flow from the catalytic converter 530 into the collection chamber 541 of the first cooling manifold 540. This collection chamber 541 allows both hot gases 603 and treated byproduct 604 to be positioned for cooling via the heat exchanger 547 created within the first cooling manifold 540.

Positioned parallel to the collection chamber 541 is a heat exchanger 547 that consists of a plurality of conduits 544-546 in which the actual heat exchange takes place. The first conduit 544 is larger in both length and diameter in comparison to the second conduit 545 and the third conduit 546. Moreover, it is preferable that the first conduit 544 is of a sufficient size and dimension to encapsulate and fit over both the second conduit 545 and the third conduit 546.

The first conduit 544 includes a water intake 548 and a corresponding water discharge 549. Connected to the first conduit 544 through the water intake 548 is a water supply line 542. The water supply line 542 provides cooling water 543 to the first cooling manifold 540—typically from the municipal water supply available in the facility 300—which is at ambient temperature. However, the cooling water 543 can alternatively be any liquid capable of heat exchange. Thus, this water supply line 542 helps fill the first conduit 544 with cooling water 543 to help in the heat exchange process.

Positioned within the first conduit 544 of the heat exchanger 547 is the second conduit 545. Both hot gases 603 and treated byproduct 604 enter the second conduit 545 through the chamber collection 541. Heat exchange occurs when the warmer second conduit 545 is cooled by the surrounding cooling water 543 positioned within the first conduit 544. This heat exchange can cause portions of the gaseous treated byproduct 604 to liquefy—causing separation with the hot gases 603.

Warmed cooling water 543 is then removed and repositioned through an outlet 549 in the first conduit 544, which in turn feeds a second heat exchanger 547 positioned directly below the first heat exchanger 547. This removed warmed cooling water 543 then flows into the inlet 548 of the second heat exchanger to fill another first conduit 544. This process of removing, repositioning and re-feeding cooling water 543 can continue throughout as many heat exchangers 547 as necessary to effectuate appropriate separation.

After use within the various heat exchangers 547 positioned within the cooling manifold 540, the cooling water 543 is then removed and emptied into a heat exchange module 800 (described in greater detail below). Upon leaving the cooling manifold 540, the cooling water 543 is typically well above ambient temperature and is typically above 140 degrees Fahrenheit. Such cooling water 543 constitutes useful heat that can be used for a variety of various applications including, but certainly not limited to, assisting in heating water for use and consumption throughout the home or commercial facility.

Positioned within the second conduit 545 of each heat exchanger 547 is a third conduit 546. The third conduit 546 functions primarily to collect the various cooled and now liquefied treated byproduct 604. Positioned on the bottom of each third conduit 546 are perforations sufficient to collect liquid by product 604 cooled within the second conduit 545. Positioned at the distal end of the third conduit 546 is a connecting elbow 552. Positioned outside of both the first conduit 544 and second conduit 545, the connecting elbow 552 further effectuates liquefaction and condensing of the byproduct 604 (via air cooling) and then transports this liquid to the first liquid separator 560.

As further shown in FIG. 5, the distal end of each third conduit 546 contains a connecting elbow 552, which horizontally feeds into a centralized condensate drain 553. This condensate drain 553 functions to house and maintain all of the liquid treated byproduct 604 from the various third conduits 546 of each heat exchanger 547. This resulting byproduct 604 can then be removed from the cogeneration system 500 through a disposal—which can be part of residential facilities 300 regular sewer or septic lines (or alternatively can be vented).

Likewise, cooled hot gases 603 (which remain in the second conduit 544) are then transported to the next heat exchanger for additional cooling. This continues until the hot gases 603 reach near ambient temperature. This also helps ensure any treated byproduct 604 is properly separated for placement in the condensate drain 553. Any remaining hot gases 603 may be recycled back from the first cooling manifold 540 into the catalytic converter 530. Alternatively, these hot gases 603 may be additionally treated and cooled in a second cooling manifold 550.

Preferably, the liquid treated byproduct 604 is passed through the first liquid separator 560 shown in both FIG. 3 and FIG. 5. This liquid separator 560 includes a partial vacuum that can draw any additional undesirable light gases out of the treated byproduct 604. These gases 605 can either be retreated in the catalytic converter 540 via a recycle stream or alternatively vented from the cogeneration system 500 to a passageway outside of the residential facility 300. Once these gases 605 are extracted through the partial vacuum, the remaining treated byproduct 604 can be drained through the residential facility's 300 septic or sewer system.

The Heat Exchange Module

Figure 6:
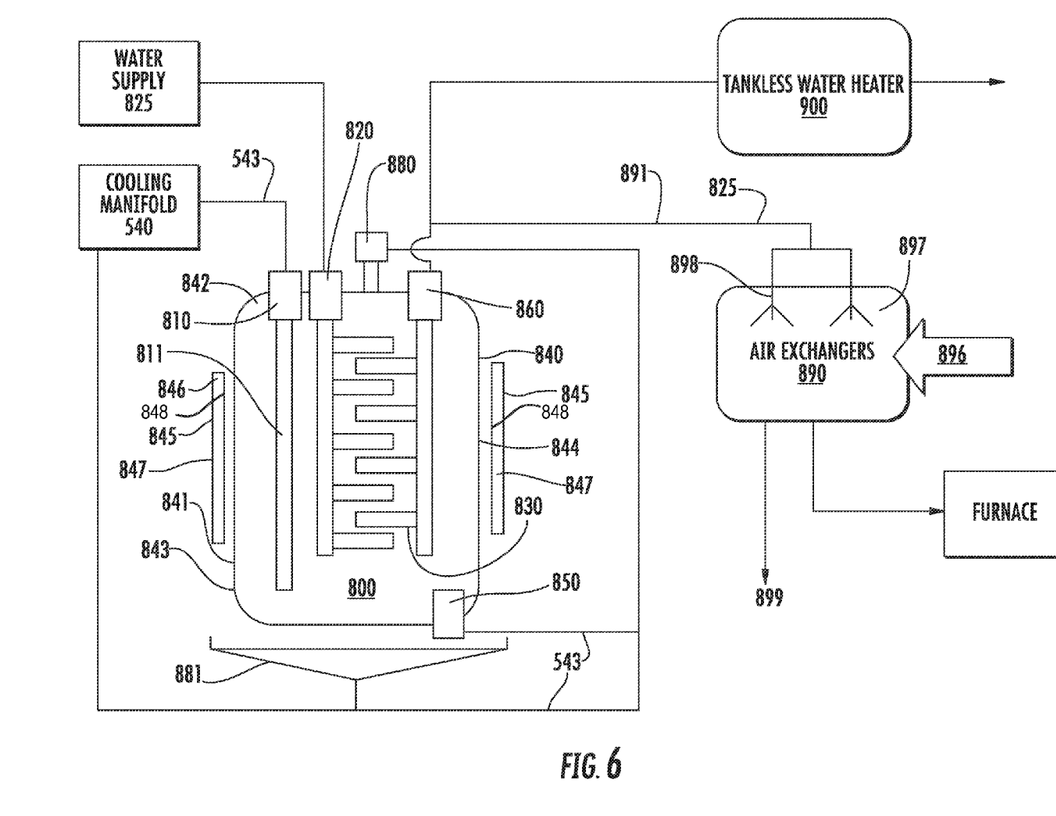
FIG. 6 illustrates the components of the heat exchange module.

The invention is further directed to a heat exchange module 800 (hereinafter the "module 800"). FIG. 6 provides, by way of example, one embodiment of the module 800. As shown and illustrated, the module 800 includes six primary components (a) a first inlet 810 for injecting cooling water 543 (or any other similar cooling fluid), (b) a second inlet 820 for introducing the cold water supply 825 (typically from a municipal source), (c) contact coils 830 which function to effectuate heat exchange, (d) the insulated housing 840 which positions and maintains the contact coils 830, (e) the first outlet 850 for removing the cooling fluid 543, and (f) the second outlet 860 for removing the treated water supply 825.

As illustrated in FIG. 6, the central component of the module 800 is the insulated housing 840. The insulated housing 840 is hard, resilient, non-corrosive and watertight. Moreover, the insulated housing 840 includes an inner shell 841, which has a top side 842, a corresponding bottom side 843, and a cylindrical middle portion 844. The cylindrical middle portion 844 is located between both sides 842 and 843 and preferably includes multi-layers of insulate 845.

The insulate 845 includes a first insulate layer 846, a second insulate layer 847 and a third insulate layer 848. These three layers of insulate 845 are positioned outside the inner shell 841 which helps effectuate heat transfer, as well as maintain an above ambient temperature environment within the insulated housing 840. Moreover, the inner shell 841 is made of a lightweight and durable material such as a ceramic, composite, glass or metal. More specifically, the inner shell 841 can be of uni-body construction and formed from aluminum.

Positioned on the top side 842 of the inner shell 841 is the first inlet 810. The first inlet 810 functions to inject cooling water 543 from either cooling manifold (540 or 550) into the module 800. The first inlet 810 connects to a vertical injector 811 which introduces the now warmed cooling water 543 into the bottom of the inner shell 841. Upon residing within the inner shell 841 for a pre-specified period of time, the cooling water 543 can be removed from the insulated housing 840 through the first outlet 850. The cooling water 543—now cooled through contact with the cold water supply 825—can return to either cooling manifold (540 or 550) to help further effectuate heat exchange with the hot gases 603.

As further shown and illustrated in FIG. 6, the top end 841 of the insulated housing 840 also includes the second inlet 820. The second inlet 820 functions to introduce the cold water supply 825 into the module 800. This cold water supply 825 is typically from a municipal authority (such as a city water line) or well. More specifically, the second inlet 820 flows into a plurality of contact coils 830 positioned within the inner shell 841. While the contact coils 830 can take many a shape and form, they are preferably curved in a manner that maximizes their overall surface area—which allows greater thermal contact between the warmer cooling water 543 and the cold water supply 825. Upon treatment within the contact coils 830, the now warmed water supply 825 is removed from the module 800 and transported to a tankless water heater 900.

Prior to entry in the tankless water heater 900, the now warmed water supply 825 is well above ambient temperature. Accordingly, the heating of this warmed water supply 825 requires less energy within the tankless water heater 900 in order to supply warm water to various parts of the home or commercial facility (in comparison with traditional tankless water heaters 900 which receive water directly from a municipal source). Moreover, this efficiency is no longer dependent upon the temperature of the water supply 825 provided by a municipal authority (or outside well)—or based upon the outside weather conditions. Put another way, implementation of the module 800 allows use of the tankless water heater 900 in any geographic location—regardless of whether the home or commercial facility is in a warm weather climate.

One issue presented by the module 800 is the risk of pressure differentials. Because the cooling water 543 (positioned within the inner shell 841) transitions from hot to cold (upon heat exchange with the municipal or well based water supply 825) such cooling water 543 can have thermal expansion. Accordingly, the invention contemplates a pressure relief valve 880 positioned on the top side 542 to exhaust and remove any necessary excess cooling water 543 created through heat exchange. An emergency drain pan 881 can be positioned below the bottom side 842 of the insulated housing 840 to collect such excess cooling water 543. Alternatively, fluid received from the pressure relief valve 880 can be returned to either manifold 540 or 550.

FIG. 6 further shows how usable heat—provided in the form of heated cooling water 543—can be used to effectuate heat exchange with other components of the cogeneration system 100, such as the air and heating systems. One secondary heat exchange contemplated by the module 800 includes pre-heating air prior to introduction into the furnace of the home or commercial facility. This can be accomplished through a secondary air exchanger 890.

As shown and illustrated in FIG. 6, the secondary air exchanger 890 first includes an exchange feed 891 which draws heated cooling water 543 from the insulated housing 540. Preferably, this exchange feed 891 is located and positioned on the top side 542 of the inner shell 541. The exchange feed 891 then transports the heated water supply 825 into an air exchanger 890. The purpose and functionality of the air exchanger 890 is to allow the heated water supply 825 to heat up (warm) an incoming air feed 896 prior to entry into the furnace. This can be accomplished by either a misting system 897 or a series of micro-coils 898 (or combination of both). Upon heat exchange, the heated water supply is collected and then either (a) fed back into the module 800 through a return feed 899 or (b) alternatively recycled back to either cooling manifold (540 or 550) to be rewarmed and then returned to the module 800.

The Module Controller

Figure 7:
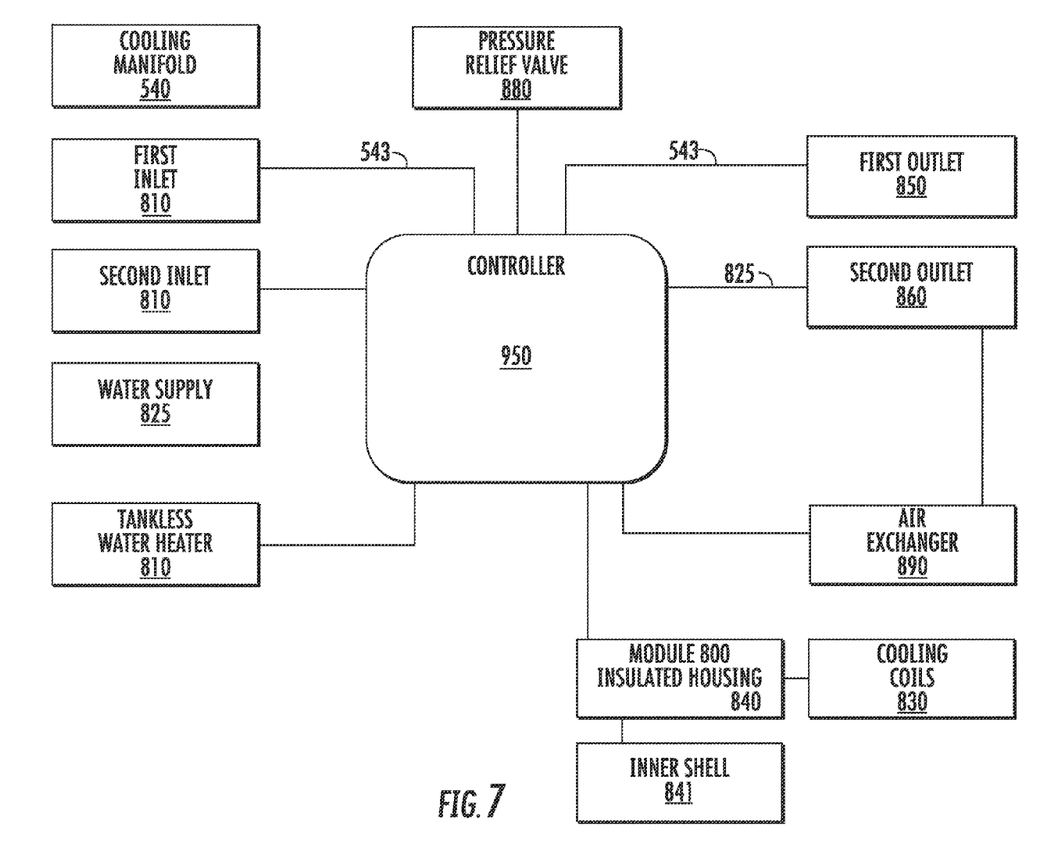
FIG. 7 is a schematic illustrating the module controller.

In addition, FIG. 7 shows how a controller 950 can be connected to the module 800, as well as its components 960 (i.e., the air exchanger 890, the first inlet 810 and the first outlet 850). The controller 950 functions to regulate and time introduction and removal of cooling water 543 throughout these components to optimize efficiency of the system. In one embodiment contemplated by the invention, the controller 950 can measure the internal temperature of the inner shell 841 and gauge whether to draw warmed cooling water 543 from the cooling manifolds (540 or 550) or stagnant cooling water 543 through the first outlet 550.

Alternatively, the controller 950 can order removal of cooling water 543 from the insulated housing 840 for purposes of introduction into the air exchanger 890 (based upon communication with the furnace). Similarly, once cooling water 543 is removed for use in the air exchanger 890, the controller 950 can determine if there is sufficient fluid within the inner shell 841 and draw more cooling water 543 from one or more manifolds (540 and 550). This helps to ensure not only that there is no stagnation of the cooling water 543 within the insulated housing 540, but also that the temperature of such cooling water 543 can effectively make thermal contact with (and warm) the cooling coils 830.

Method of Employing Usable Heat

The invention is also directed to a method of employing usable heat created by a cogeneration system 100. The method first includes the step of feeding cooling water 543 from the cogeneration system 100 into a first inlet 810 which in turn fills a module 800 having an insulated housing 840. Here, the insulated housing 840 has a top end 842, a bottom end 843 and a corresponding cylindrical middle portion 844. The second step includes introducing a water supply 543 through a second inlet connected to one or more contact coils 830 positioned within the insulated housing 840. Next, the method contemplates effectuating heat exchange through the cooling water 543 interacting with the contact coils 830, which are filled with the cooler water supply 825. Upon heat exchange, cooling water 543 is removed from the module 800, while water supply 825 is removed from the contact coils 830 and transported to a tankless water heater 900.

The method further contemplates use of a controller 950 which is connected to the first inlet 810, second inlet 820, first outlet 860 and second outlet 870. The method thus includes the step of using the controller 950 to regulate introduction and removal of cooling water 543 within the insulated housing 540. In addition, such controller 950 can help time removal of water supply 543 from the cooling coils 830 within the insulated housing 840.

I claim:

1. A heat exchange module for employing usable heat created by a cogeneration system, the heat exchange module comprising:
    an insulated housing having a top end and a bottom end;
    a first intake for introducing cooling water from the cogeneration system into the insulated housing;
    a second intake to feed a water supply into one or more contact coils to effectuate heat exchange with the cooling water, the one or more contact coils positioned within the insulated housing;
    a first outlet to remove the cooling water from the insulated housing; and
    a second outlet to remove the water supply from the one or more contact coils for use by a tankless water heater.

2. The module of claim 1, wherein the first outlet returns cooling water into the cogeneration system.

3. The module of claim 1, wherein the insulated housing further comprises:
    an inner shell having a cylindrical middle portion positioned between the top side and bottom side of the insulated housing; and
    an insulate positioned around the cylindrical middle portion.

4. The module of claim 3 wherein the insulate includes a first insulate layer, a second insulate layer and a corresponding third insulate layer.

5. The module of claim 1, further comprising a pressure relief valve positioned on the top end of the insulated housing.

6. The module of claim 5, wherein the module includes an emergency drain pan for reclaiming cooling water released by the pressure relief valve.

7. The module of claim 1, further comprising a controller connected to the first inlet, second inlet, first outlet and second outlet.

8. The module of claim 7, wherein the controller functions to regulate introduction and removal of cooling water within the insulated housing.

9. The module of claim 7, wherein the controller functions to regulate removal of water supply from the one or more contact coils within the insulated housing.

10. A method of employing usable heat created by a cogeneration system, the method comprising the steps of:

(a) feeding cooling water from the cogeneration system into a first inlet which in turn fills a module having an insulated housing, the insulated housing having a top end and a bottom end;
(b) introducing a water supply through a second inlet connected to one or more contact coils positioned within the insulated housing;
(c) effectuating heat exchange through the cooling water interacting with the one or more contact coils filled with the water supply;
(d) removing the cooling water from the module; and
(e) removing the water supply from the one or more contact coils and transport to a tankless water heater.

11. The method of claim 10, wherein the first outlet returns cooling water into the cogeneration system.

12. The method of claim 10, wherein the insulated housing comprises an inner shell having a cylindrical middle portion positioned between the top side and bottom side of the insulated housing, and an insulate positioned around the cylindrical middle portion.

13. The method of claim 12, wherein the insulate includes a first insulate layer, a second insulate layer and a corresponding third insulate layer.

14. The method of claim 10, wherein the module includes a pressure relief valve positioned on the top end of the insulated housing.

15. The method of claim 14, wherein the module further includes an emergency drain pan for reclaiming cooling water released by the pressure relief valve.

16. The method of claim 10, wherein the module further includes a controller connected to the first inlet, second inlet, first outlet and second outlet.

17. The method of claim 16, further comprising the step of regulating introduction and removal of cooling water within the insulated housing.

18. The method of claim 16, further comprising the step of timing removal of water supply from the one or more contact coils within the insulated housing.

* * * * *